United States Patent
Sergeev

(10) Patent No.: US 11,095,430 B2
(45) Date of Patent: Aug. 17, 2021

(54) METHOD AND SYSTEM OF LATENCY ASSESSMENT IN A PACKET DATA NETWORK

(71) Applicant: ADVA Optical Networking SE, Martinsried/Munich (DE)

(72) Inventor: Andrew Sergeev, Kfar Saba (IL)

(73) Assignee: ADVA Optical Networking SE, Martinsried/Munich (DE)

( * ) Notice: Subject to any disclaimer, the term of this patent is extended or adjusted under 35 U.S.C. 154(b) by 161 days.

(21) Appl. No.: 16/591,957

(22) Filed: Oct. 3, 2019

(65) Prior Publication Data

US 2020/0252201 A1 Aug. 6, 2020

(30) Foreign Application Priority Data

Feb. 6, 2019 (EP) .................................... 19155746

(51) Int. Cl.
*H04L 9/32* (2006.01)
*H04L 9/06* (2006.01)
*H04L 29/06* (2006.01)

(52) U.S. Cl.
CPC ........ *H04L 9/0618* (2013.01); *H04L 63/0428* (2013.01)

(58) Field of Classification Search
CPC ..... H04L 9/0618; H04L 9/3297; H04L 9/088; H04L 9/14; H04L 43/106; H04L 43/0864;
(Continued)

(56) References Cited

U.S. PATENT DOCUMENTS 9,338,146 B2 * 5/2016 Casas-Sanchez ... H04L 63/0428
9,615,258 B2 * 4/2017 Chen ..................... H04L 63/164
(Continued)

FOREIGN PATENT DOCUMENTS

EP 2 247 080 A1 3/2010
EP 3 186 923 3/2016

OTHER PUBLICATIONS

Ai Tamimi, A. "Performance Analysis of Data Encryption Algorithms"; Retrieved from Internet: <URL: https://www.cse.wustl.edu/~jain/cse567-06/ftp/encryption_perf/#5>; Retrieved on Nov. 16, 2020.
(Continued)

*Primary Examiner* — Amare F Tabor
(74) *Attorney, Agent, or Firm* — Wiggin and Dana LLP; Gregory S. Rosenblatt

(57) ABSTRACT

There are provided a method and system for assessing latency of ciphering end point of secure communication channel. The method comprises: generating a test traffic comprising a series of original data packets, wherein, for each original data packet, size of a given packet is uniquely indicative of the packet's place in a sequence of data packets in the series and enables unique correspondence with a size of the given packet upon its encryption; successively transmitting the original packets to the ciphering end point, whilst associating with respective departure time stamps; receiving encrypted packets from the ciphering end point and associating them with respective arrival time stamps; using a size of a given encrypted packet with a timestamp $TS_a$ to identify a size of a matching original packet, its place in the sequence of original packets and, thereby, its departure timestamp $TS_d$, thus giving rise to a plurality of timestamp pairs ($TS_d$; $TS_a$).

18 Claims, 7 Drawing Sheets

(58) Field of Classification Search
CPC ..... H04L 43/10; H04L 63/00; H04L 63/0428; H04L 11/3414; H04L 11/3006; H04L 2209/26; H04L 2201/835
USPC .......................................................... 713/168
See application file for complete search history.

(56) References Cited

U.S. PATENT DOCUMENTS

| | | | | |
|---|---|---|---|---|
| 9,667,521 | B2* | 5/2017 | Pietrowicz | H04L 45/02 |
| 9,853,949 | B1* | 12/2017 | Stickle | H04L 63/0428 |
| 9,942,787 | B1 | 4/2018 | Tillotson | |
| 10,129,298 | B2* | 11/2018 | Grady | G06F 21/45 |
| 10,379,747 | B2* | 8/2019 | Erickson | G06F 3/0655 |
| 10,659,476 | B2* | 5/2020 | Ramanujan | H04L 69/22 |
| 10,678,569 | B2* | 6/2020 | Mukraj | G06F 13/102 |
| 10,785,021 | B1* | 9/2020 | Prabhat | H04L 9/3213 |
| 10,951,596 | B2* | 3/2021 | Muzaffar | G06F 21/64 |
| 2006/0285501 | A1 | 12/2006 | Damm | |
| 2009/0060197 | A1* | 3/2009 | Taylor | H04L 9/0618 380/277 |
| 2015/0304204 | A1 | 10/2015 | Robitaille et al. | |
| 2018/0123910 | A1 | 5/2018 | Fitzgibbon | |

OTHER PUBLICATIONS

Bradner, S. "Benchmarking Methodology for Network Interconnect Devices"; Retrieved from Internet: <URL: https://tools.ietf.org/html/rfc2544>; Retrieved on Nov. 16, 2020; Dated Mar. 1999.

ITU-T Y.1564 "Ethernet service activation test methodology", ITU-T Y-Series Recommendations, International Telecommunication Union, Dated Feb. 2016.

Kent, S. "IP Encapsulating Security Payload"; Retrieved from Internet: <URL: https://tools.ietf.org/html/rfc4303#section-2.4>; Retrieved on Dec. 1, 2020; Dated Dec. 2005.

Kim, J. et al. "Security and performance considerations in ROS 2: A Balancing Act" (2018), arXiv preprint, arXiv: 1809:09566.

McGrew, D. "An Interface and Algorithms for Authenticated Encryption"; Retrieved from Internet: <URL: https://tools.ietf.org/html/rfc5116#page-15>; Retrieved on Dec. 1, 2020; Dated Jan. 2008.

Diallo, T. et al. "EtherSAM: The new standard in Ethernet service testing. Quebec City: EXFO Inc." (2013).

* cited by examiner

IPSec

METHOD AND SYSTEM OF LATENCY ASSESSMENT IN A PACKET DATA NETWORK

CROSS-REFERENCE TO RELATED APPLICATIONS

The present application claims priority to European Patent Application No. 19155746.1 that was filed Feb. 6, 2019, the contents of which is hereby incorporated by reference in its entirety.

TECHNICAL FIELD

The presently disclosed subject matter relates to the field of assessing performance in packet data networks and, more particularly, to assessing latency therein.

BACKGROUND

The ever-increasing complexity of modern communication services puts a great deal of importance on service assurance. Service assurance is primarily focused on processes and procedures involving the monitoring of network services and their underlying infrastructure (including virtualized network services and virtualized infrastructure) in an effort to maintain a particular service quality. Performance assessment plays an important role in service assurance. Typical methodologies and schemes of performance assessment are described in RFC 2544 entitled: "Benchmarking Methodology for Network Interconnect Devices", and ITU-T Y.1564 entitled: "Ethernet Service Activation Test Methodology", which are both incorporated herewith by reference in their entirety.

One of the critical metrics of performance of a packet data network is latency of data packets delivery. Problems of latency measurements have been recognized in the conventional art and various techniques have been developed to provide solutions, for example:

US Patent Application No. 2006/0285501 discloses performance measurements (PM) performed over Layer 2 of a network. A PM frame is sent from a source MFP (Maintenance End Point) to a destination MEP. The PM frame is timestamped immediately prior to transmission, and the local clock at the destination MEP is noted immediately upon arrival. MIPs (Maintenance Intermediate Points) may also time stamp the PM frame. Preferably, each PM frame has an interval (session) identifier and a sequence number within the interval. The PM frames are received by and sent by PM modules within the nodes of the network. The PM modules include a Sender function for sending an interval of one or more PM frames and a Receiver function for receiving PM frames and computing measurements.

US Patent Application No. 2015/0304204 discloses a system for out-of-line testing of performance of a network. The system comprises a multiplexer at an input to the network and a de-multiplexer at an output from the network. The multiplexer comprises a traffic generator to insert synthetic traffic, and a first switch to accept an incoming customer traffic stream and to join said incoming customer traffic stream with a synthetic traffic stream to form a total traffic stream, the total traffic stream fed to said input to said network. The de-multiplexer comprises a second switch to receive the total traffic stream from the output of the network, and separate the total traffic stream into the synthetic traffic stream and the customer traffic stream, and a traffic analyzer to analyze the separated synthetic traffic stream.

US Patent Application No. 2018/0123910 discloses techniques for performing monitoring of path quality in a network. Path quality requests and measurements can be piggy-backed on the data traffic that is flowing through a secure connection between two network nodes. For example, path quality requests and measurements can be inserted into the TFC padding field of IP/ESP packets that are being communicated between two IPsec devices.

U.S. Pat. No. 9942787 discloses a technique of virtual private network connection quality analysis. A first network packet directed from one VPN endpoint to a second VPN endpoint is received at an intermediary network processing component. Metadata indicating that the first network packet is a candidate for monitoring is stored. In response to determining that a second packet received at the intermediary comprises an acknowledgement to the first packet, a traffic quality metric is stored at a location accessible to a VPN traffic analyser. The VPN traffic analyser responds to a traffic quality query using the metrics collected at the intermediary.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

In accordance with certain aspects of the presently disclosed subject matter, there is provided a method of assessing latency of a ciphering end point of a secure communication channel. The method comprises: a) generating, by a traffic analyzer, a test traffic comprising a series of original data packets, wherein, for each original data packet, a size of a given packet is uniquely indicative of the packet's place in a sequence of data packets in the series and enables unique correspondence with a size of the given packet upon its encryption; b) successively transmitting the original packets in the generated series to the ciphering end point, whilst associating the transmitted original packets with respective departure time stamps; c) receiving, by the traffic analyzer, encrypted packets from the ciphering end point and associating the received encrypted packet with respective arrival time stamps; and d) for each packet of at least part of the received encrypted packet, using a size of a given encrypted packet with a timestamp $TS_a$ to identify a size of a matching original packet, its place in the sequence of original packets and, thereby, its departure timestamp $TS_d$, thus giving rise to a plurality of timestamp pairs ($TS_d$; $TS_a$), each timestamps pair indicative of delay in delivery for a respective pair of matching packets, the plurality of timestamp pairs usable for latency assessment.

In accordance with further aspects of the presently disclosed subject matter, the size of a given encrypted packet is defined as $size_e = size_o + \Delta$, where $size_o$ is the size of the given packet before encryption and $\Delta$ is AEE (authentication, encryption and encapsulation) overhead corresponding to a protocol applied when creating the secured communication channel.

By way of non-limiting examples, the applied protocol can be Encapsulating Security Payload (ESP) protocol, WindGuard® protocol or Media Access Control Security (MACsec) protocol.

By way of non-limiting examples, the ciphering end point can encrypt the original packets using a block cipher algorithm or stream cipher algorithm.

In accordance with further aspects of the presently disclosed subject matter, the ciphering end point can encrypt the original packets using a ciphering algorithm characterized by a plaintext alignment size (PTAS). Optionally, a size of each original packet can be configured as a unique multiple of PTAS, and the original packets of different unique sizes can be distributed in the series in accordance with a predefined function. Optionally, the predefined function can be a monotonically increasing sequence of multiples of PTAS.

In accordance with further aspects of the presently disclosed subject matter, when the test traffic comprises a plurality of series of original data packets, the method further comprises repeating operations a)-d) for each series of the plurality of series. Each two series can be separated by a plurality of data packets identifiable by the traffic analyzer as "idle" packets, wherein time of transmission of the idle packets between two series significantly shall exceed the maximal registered and/or expected latency. The idle packets can be identifiable by their size. Optionally, idle packets can be of equal size. The size of idle packets can be multiple of PTAS, and shall be excluded from the sizes of original packets.

The method can comprise one or more of the aspects listed above, in any desired combination or permutation which is technically possible.

In accordance with other aspect of the presently disclosed subject matter, there is provided a traffic analyzer configured to operate in accordance with any technically possible combination or permutation of the above aspects of the method of assessing latency of the ciphering end point.

In accordance with other aspect of the presently disclosed subject matter, there is provided a computer program product implemented on a non-transitory computer usable medium and comprising computer readable program code for performing any technically possible combination or permutation of the above aspects of the method of assessing latency of the ciphering end point.

Among advantages of certain embodiments of presently disclosed subject matter is the capability of assessing latency of a ciphering end point with no need of decrypting packets therefor.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "calculating", "generating", "obtaining", "enabling", or the like, refer to the action(s) and/or process(es) of a computer that manipulate and/or transform data into other data, said data represented as physical, such as electronic, quantities and/or said data representing the physical objects.

The term "computer" should be expansively construed to cover any kind of hardware-based electronic device with data processing capabilities including, by way of non-limiting example, the traffic analyzer and processing circuitry therein disclosed in the present application.

The operations in accordance with the teachings herein can be performed by a computer specially constructed for the desired purposes or by a general-purpose computer specially configured for the desired purpose by a computer program stored in a computer readable storage medium.

The terms "non-transitory memory" and "non-transitory storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages can be used to implement the teachings of the presently disclosed subject matter as described herein.

Figure 1A:
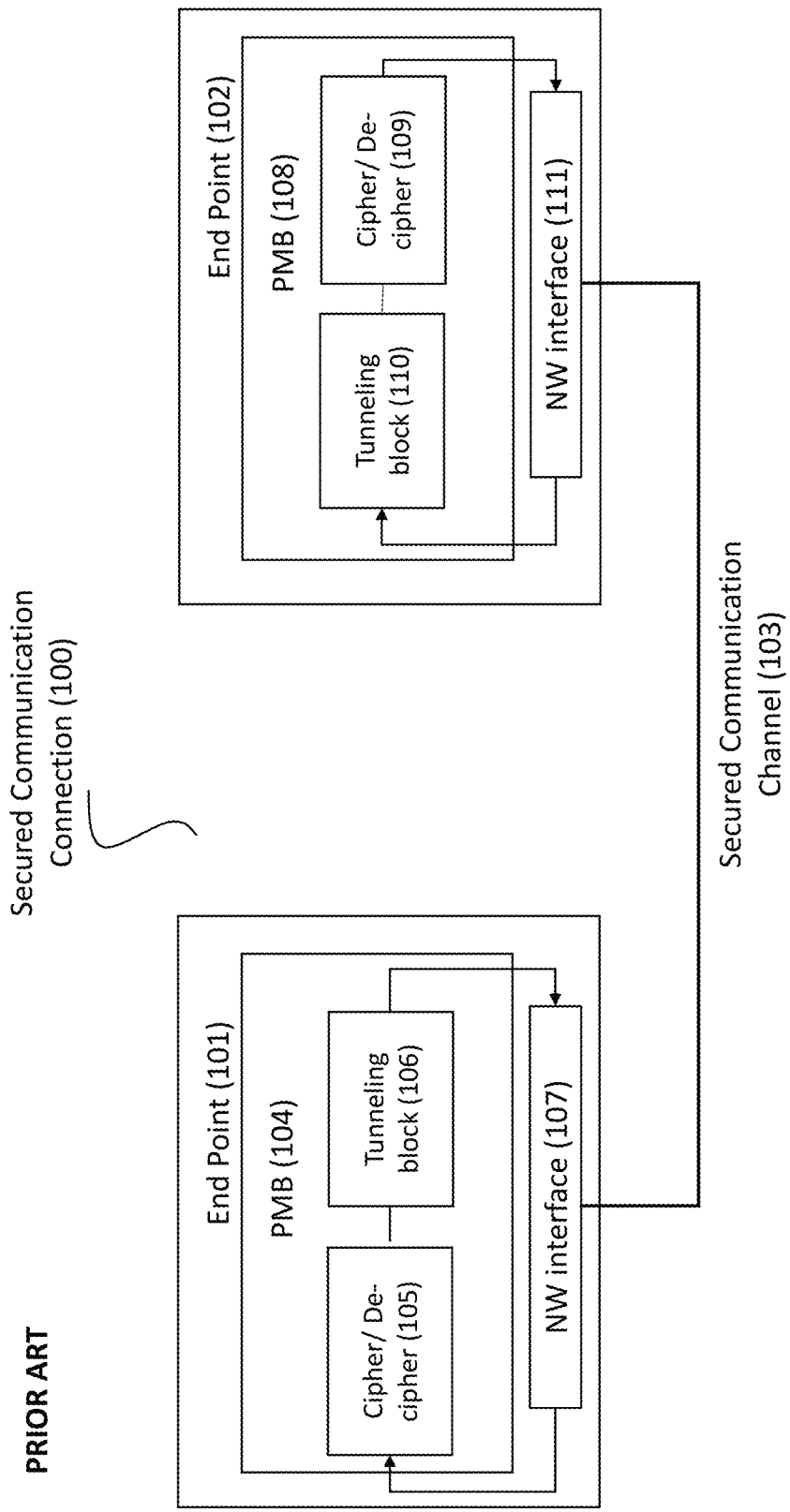
FIG. 1a schematically illustrates a generalized block diagram of a secured communication connection as known in the art.

Bearing this in mind, attention is drawn to FIG. 1a schematically illustrating a secured communication connection as known in the art. The secured communication connection 100 is constituted by an end point 101 and an end point 102 connected, via a packet data network (not shown for simplicity of illustration), by a secured communication channel 103. End point 101 comprises a processor operatively connected to a memory (jointly referred to hereinafter as a processor and memory block (PMB)). PMB 104 comprises a cipher/de-cipher device 105 operatively connected to a tunnelling block 106, both operatively connected to a hardware-based network interface 107. Likewise, end point 102 comprises PMB 108 with, implemented thereon, a cipher/de-cipher device 109 operatively connected to a tunnelling block 110, both operatively connected to a hardware-based network interface 111.

End points establish secured communication channel 103 therebetween with the help of a suitable protocol (e.g. IPSec, WireGuard®, MACsec, etc.) configured to authenticate, encrypt and encapsulate (when relevant) data packets sent over the network. The secured communication channel 103 is established over a communication path (not shown) constituted by a respective underlying network infrastructure.

It is noted that for purpose of illustration only, the following description is provided for IP packets. Those skilled in the art will readily appreciate that the teachings of the presently disclosed subject matter are, likewise, applicable to other data packets (e.g. MPLS, etc.).

It is further noted that the teachings of the presently disclosed subject matter are not bound by the illustrated protocols and, likewise, applicable also to other protocols capable of establishing an encrypted connection with constant-size overhead added to data packets.

Figure 1B:
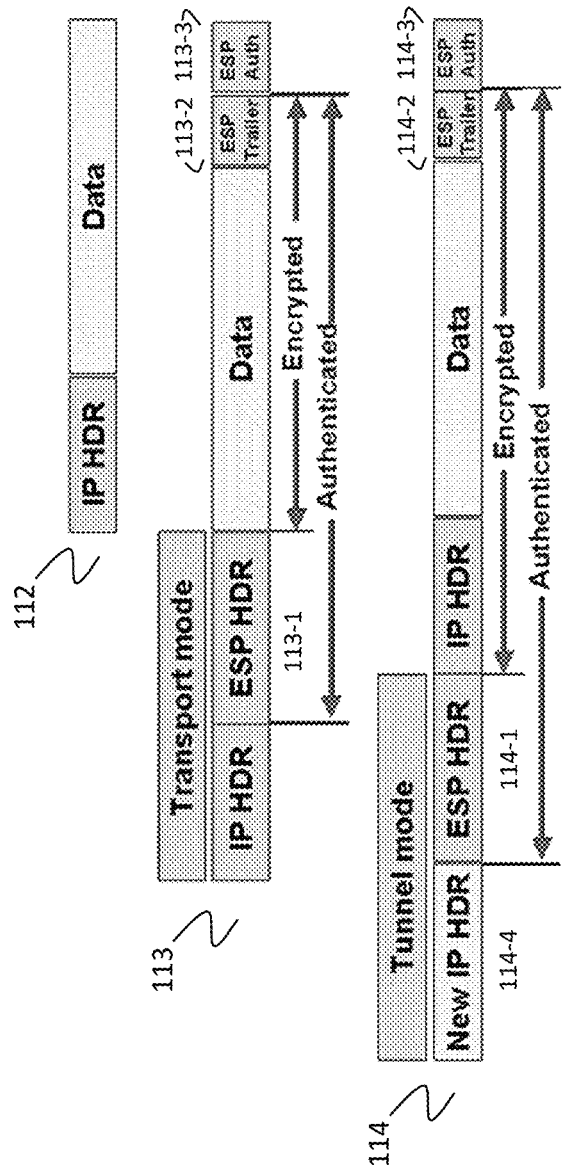
FIG. 1b schematically illustrates a structure of an IP packet upon applying Encapsulating Security Payload (ESP) protocol as known in the art.

IPsec (Internet Protocol Security) is a network protocol suit including protocols for establishing mutual authentication between end points at the beginning of a session and negotiation of cryptographic keys to use during the session. IPsec protocol suite comprises Encapsulating Security Payload (ESP) protocol. ESP is capable of creating two types of secure channels between two end-nodes: a transport mode secure channel, and a tunnel mode secure channel. As illustrated with reference to FIG. 1b, in a transport mode, the encrypted packet 113 comprises encrypted and authenticated payload of the original IP packet 112, while the IP header of IP packet 112 is neither modified nor encrypted. In a tunnel mode, the encrypted packet 114 comprises the entire IP packet 112 upon encrypting, authenticating and further encapsulating into a new IP packet with a new IP header. In both modes the ID of IP packet 112 is encrypted within the payload.

Figure 1C:
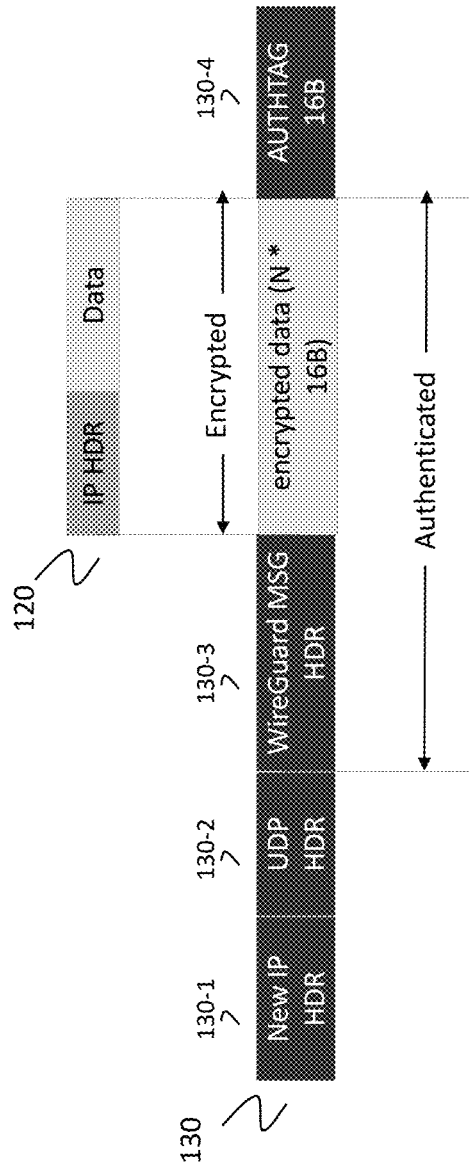
FIG. 1c schematically illustrates a structure of an IP packet upon applying WindGuard® protocol as known in the art.

WireGuard® is an open-source protocol running as a module inside a kernel (e.g. Linux kernel) and implementing virtual private network techniques to create secure point-to-point connections in routed or bridged configurations. As illustrated with reference to FIG. 1c with regard to WireGuard® encryption, encrypted IP packet 130 comprises IP packet 120 upon encrypting, authenticating and further encapsulating into a new IP packet.

The above protocols are non-limiting examples of Authenticated Encryption with Associated Data (AEAD) that, in addition to providing confidentiality for the plaintext that is encrypted, provides a way to check its integrity and authenticity and further the ability to check the integrity and authenticity of some Associated Data that is not encrypted.

It is noted that, within each of the illustrated protocols, authentication, encryption and encapsulation (AEE) overhead is constant for all IP packets transmitted via the secure communication channel. For example: for ESP transport mode, such overhead consists of ESP header 113-1, ESP Trailer 113-2 and ESP Authenticator 113-3 and is characterized by a constant size $\Delta_1=36$ bytes; for ESP tunnel mode such overhead consists of New IP Header 114-4, ESP Header 114-1, ESP Trailer 114-2 and ESP Authenticator 114-3 and is characterized by a constant size $\Delta_2=54$ bytes (with no NAT-T); for WireGuard® such overhead consists of New IP header 130-1, UDP header 130-2, WireGuard Message header 130-3 and Authentication Tag 130-4 and is characterized by a constant size $\Delta_3=60$ bytes.

Cipher/decipher device 105 and cipher/decipher device 109 are configured to provide necessary encryption/decryption in accordance with an implemented protocol.

Those versed in the art will readily appreciate that the teachings of the presently disclosed subject matter are not bound by the secured communication channel illustrated in FIG. 1a. Equivalent and/or modified functionality of the end point can be consolidated or divided in another manner and can be implemented in any appropriate combination of software with firmware and/or hardware. It is noted that the end point or parts thereof can also run in a virtual environment emulated in a hosting computer.

End-to-end (E2E) latency of the secured communication connection 100 between a source and a destination end points is characterized by delays occurring at the source (ciphering) and the destination (de-ciphering) end points summed with a network propagation delay in the communication channel. While E2E latency is the important metric, sometimes it is valuable to know the latency occurring at the source (ciphering) end point. Such latency is also referred to hereinafter as a latency of forwarding data packets between ingress and egress ports of the ciphering end point and includes also latency of processing data within the end point (e.g. ciphering, encapsulating, etc.). Assessment of such latency can be usable for troubleshooting, detecting software misbehaviour, efficiency of a respective cipher device, etc.

Current latency assessment procedures (e.g. defined by RFC 2544 and alike) are based on matching time-stamped data packets in out-going and incoming traffic and thus measuring respective delays. Known in the art techniques provide such matching with the help of data packet IDs usable for uniquely identifying each given packet. However, original packet IDs are, typically, unavailable upon encryption and, therefore, the known techniques require decrypting the packets prior to latency measurements. In the case of a single end point with a cipher device, decryption of encrypted packets requires access to cryptographic keys used by the cipher, such access being, typically, unavailable for providers of infrastructure tests.

Figure 2:
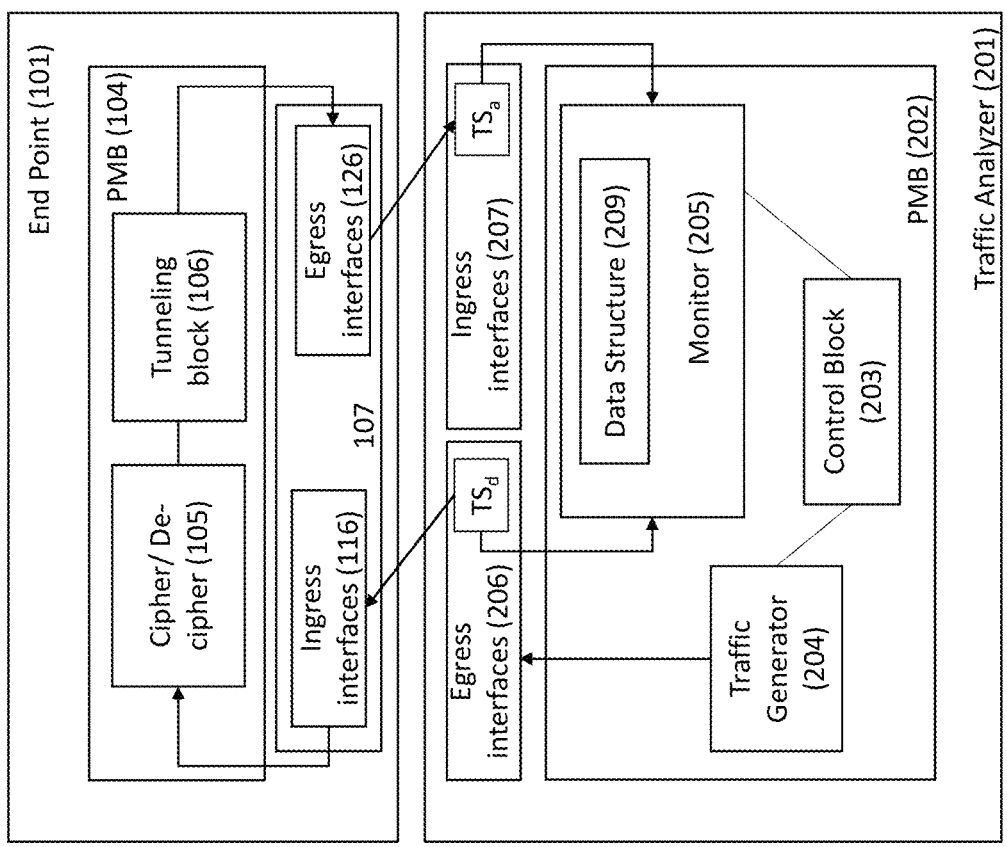
FIG. 2 schematically illustrates a generalized block diagram of a traffic analyzer in accordance with certain embodiments of the presently disclosed subject matter.

In accordance with certain embodiments of the presently disclosed subject matter, there is provided a traffic analyzer capable of matching original and encrypted test data packets with no need for knowledge of the original packet IDs. A block diagram of the traffic analyzer is illustrated in FIG. 2. Traffic analyzer 201 is configured to assess latency of the ciphering end point 101, e.g. latency of forwarding packets between ingress interface 116 receiving plain traffic and egress interface 126 transmitting encrypted data packets to secured communication channel 103. Traffic analyzer 201 comprises an egress interface 206 operatively connectable to the ingress interface 116 of end point 101 and ingress interface 207 operatively connectable to the egress interface 126 of end point 101. It is noted that, likewise, in a virtual environment latency measurements can be performed between virtual ports of the end point 101. In certain embodiments, traffic analyzer 201 can be configured as a probe using a mirrored traffic for monitoring egress interface 126. Alternatively, traffic analyzer 201 can monitor egress interface 126 as a "bump-in-a wire" inserted into the communication path between the end points or as an integral part of a network node (e.g. switch) being a part of an underlying infrastructure of the communication path.

Traffic analyzer 201 further comprises a PMB 202 configured to enable traffic analyzer's operation as detailed with reference to FIGS. 3-4. PMB 202 comprises a control block 203 operatively connected to a traffic generator 204 and a monitor 205. Traffic generator 204 is configured to generate a test traffic comprising one or more series of test IP packets configured as further detailed with reference to FIGS. 3-4. The generated test data packets are referred to hereinafter also as "original test packets" or "original packets" (or also "original test IP packets" or "original IP packets" in the case of IP packets). The generated one or more series of test IP packets are sent to end point 101 via egress interface 206 configured to timestamp each IP packet responsive to transmitting a first bit therein. Upon encrypting by cipher device 105, the encrypted test IP packets return from end point 101 to traffic analyzer 201 via ingress interface 207 configured to timestamp each arrived IP packet responsive to arrival of a first bit therein. Monitor 205 is configured to monitor interfaces 206 and 207 and to record in a data structure 209 data informative of departure timestamps ($TS_d$) in association with original test IP packets and arrival timestamps ($TS_a$) in association with respective IP packets.

As will be further detailed with reference to FIGS. 3-4, monitor 205 is further configured to match between the arrived encrypted test IP packets and the original test IP packets and to update data structure 209 in accordance with the matching results. Thus, for each arrived encrypted test IP packet, data structure 209 is configured to maintain data indicative of a pair of timestamps: arrival timestamp corresponding to time of arrival of a given encrypted test IP packet and departure timestamp corresponding to departure time of a matching original test packet. Monitor 205 is further configured to use the pairs of timestamps for latency-related calculation and to store the calculation results and/or derivatives thereof in data structure 209.

Control block 203 is configured to manage traffic generator 204 (e.g. to configure rate, size and other parameters of original test packets, etc.) and monitor 205 (e.g. to define matching functions and criteria, etc.). Further, control block 203 is configured to obtain (in push or pull mode) latency-related data from data structure 209. Control block 203 can be configured to obtain such data responsive to predefined events (e.g. responsive to an external request in a pull mode, when the calculated latency exceeds a predefined threshold in a push mode, etc.) and/or in a scheduled manner. Optionally, data structure 209 can store only the pairs of timestamps, while latency-related calculations can be distributed between monitor 205 and control block 203 or provided merely by the control block 203.

It is noted that the teachings of the presently disclosed subject matter are not bound by the architecture of the traffic analyzer illustrated in FIG. 2, equivalent and/or modified functionality can be consolidated or divided in another manner. Traffic analyzer and parts thereof can be implemented in any appropriate combination of software, firmware and/or hardware. By way of non-limiting example, traffic generator, monitor, egress interface and ingress interface can be implemented as an FPGA (Field-Programmable Gate Array). By way of another non-limiting example, egress and ingress interfaces of the traffic generator can be implemented as an ASIC (Application-Specific Integrated Circuit). The traffic analyzer can be implemented as a stand-alone device or can be integrated, fully or partly, with other test equipment and/or network equipment. Depending on the implemented latency assessing technique, packet timestamping can be provided in another way—e.g. responsive to the last departing bit, responsive to the last arriving bit, etc.

Figure 3:
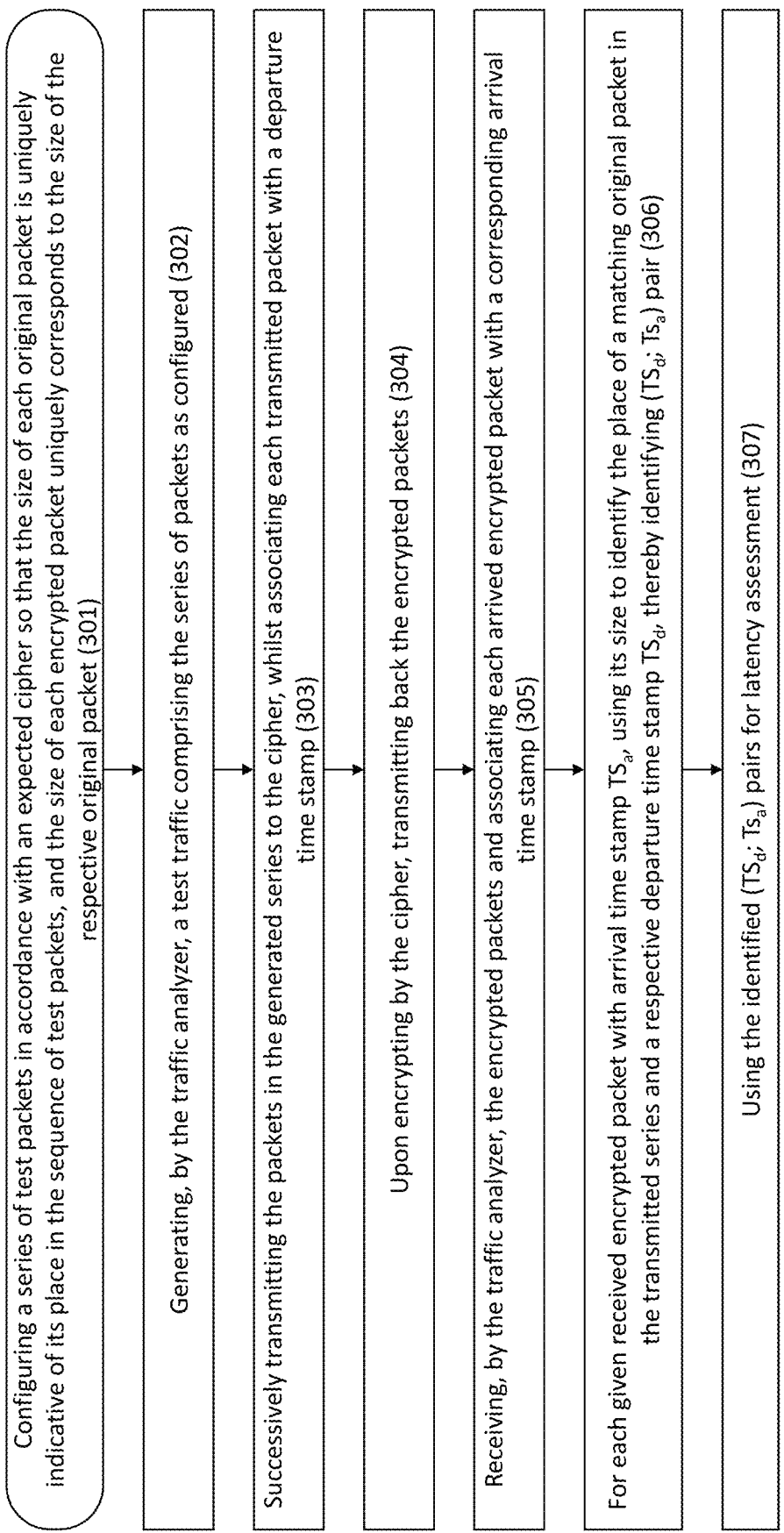
FIG. 3 illustrates a generalized flow chart of latency assessment in accordance with certain embodiments of the presently disclosed subject matter.
Figure 4A:
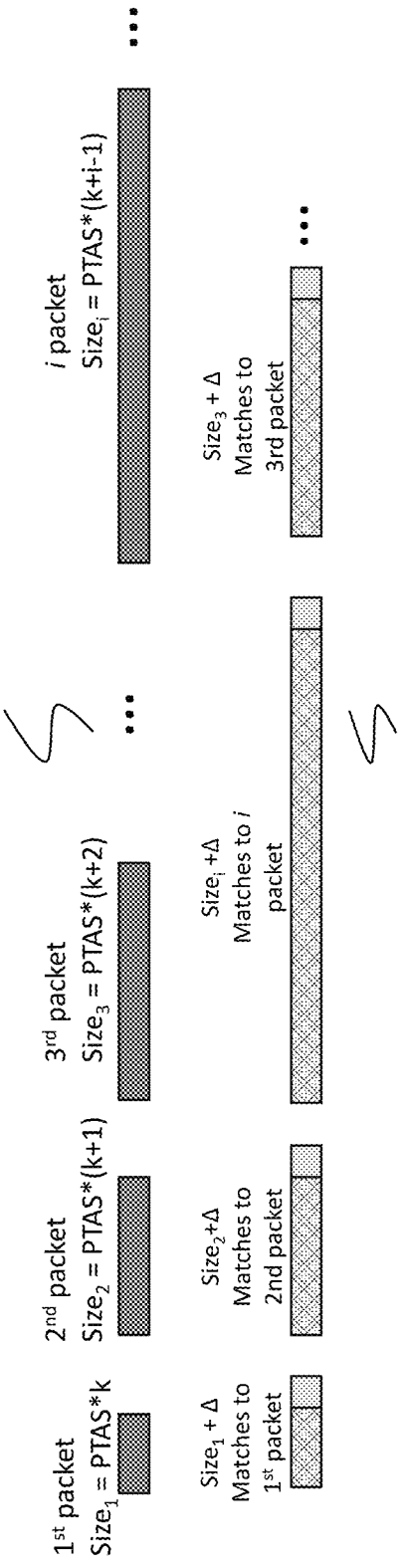
FIGS. 4a and 4b illustrate generalized pictorial representations of non-limiting examples of test packet series configured in accordance with certain embodiments of the presently disclosed subject matter.
Figure 4B:
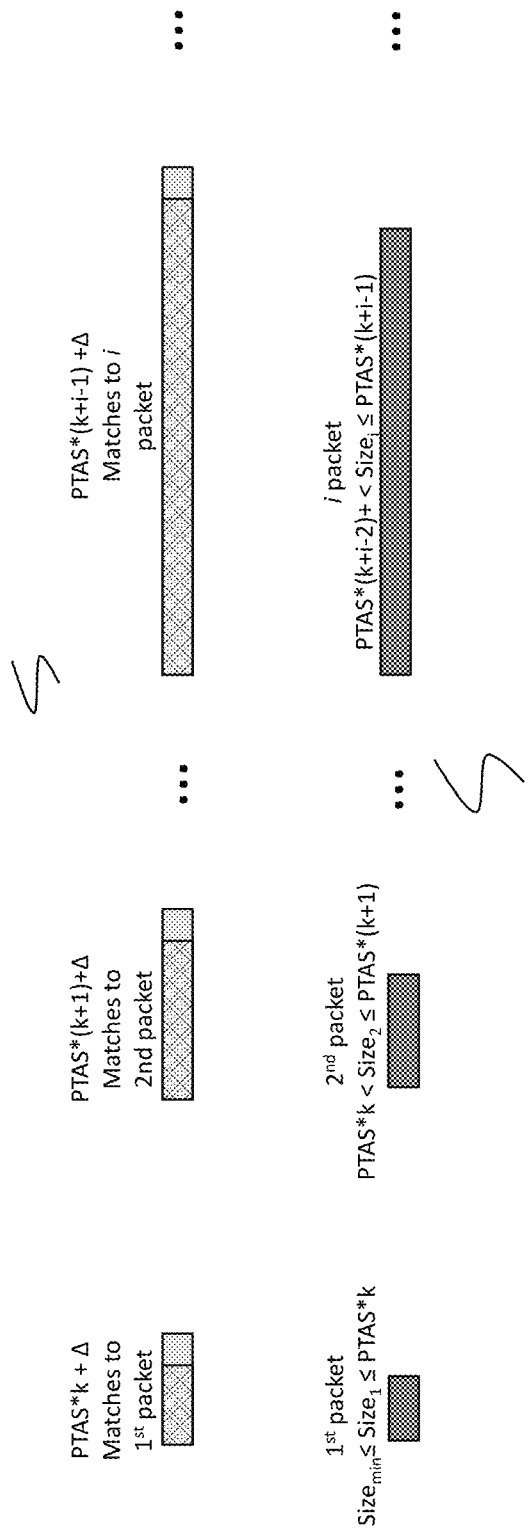

FIG. 3 illustrates a generalized flow chart of latency assessment in accordance with certain embodiments of the presently disclosed subject matter.

Prior to transmitting the test traffic, the one or more series of test IP packets are configured (301) in accordance with an expected cipher device so that the size of each original IP packet is uniquely indicative of its place in the sequence of test IP packets in one or more test series. Further, the size of each original IP packet is configured to enable unique correspondence with the size of the respective packet upon encryption.

There are two major known types of cipher devices: devices based on block ciphering algorithms, and devices based on streaming ciphering algorithms.

Block ciphering algorithms operate on fixed-length groups of bits (blocks) with an unvarying transformation that is specified by a symmetric key. The plain text is divided into blocks which are then separately encrypted to produce blocks of cipher text. An input block of size n bits and a key of size k bits both yield, upon ciphering, an n-bit output block. Block ciphering algorithms provide, when necessary, padding to the last plaintext block to yield the cipher's block size. For example, AES block cipher encrypts 128 bit blocks with a key of predetermined length of 128, 192, or 256 bits.

A stream ciphering algorithm is based on a symmetric key ciphering where plaintext bits are combined with a pseudo-random cipher bit stream (keystream). In a stream cipher, each plaintext bit is encrypted one at a time with the corresponding bit of the keystream, to give a bit of the ciphertext stream.

Different cipher devices have different plaintext aligning policies when encrypting IP packets. As stated above, padding can be required by block ciphering to align (when relevant) the plaintext to be a multiple of some number of the block size of a block cipher.

Further, irrespective of an encryption algorithm, it can be required to employ padding to ensure plaintext alignment specified by the respective protocol (e.g. ESP requires that the resulting ciphertext terminates on a 4-byte boundary, see RFC 4303 "IP Encapsulating Security Payload" incorporated herewith by reference in its entirety). Thus, a ciphering protocol can be characterized by a plaintext alignment size (referred to hereinafter as "PTAS"). By way of non-limiting examples, PTAS is equal to block size for block ciphering, equal to 1 bit for stream ciphering without padding, equal to 4 bytes for ESP, and equal to 16 bytes for WireGuard®, etc.

In accordance with certain embodiments of the presently disclosed subject matter, a series of test IP packets can be configured so that the size of each packet is a unique multiple of PTAS, and the IP packets of different unique sizes are distributed in the test series in accordance with a predefined function. A non-limiting example of such series is illustrated with reference to FIG. 4a. As illustrated, the sizes (401) of consecutive original test IP packets in the series constitute a monotonically increasing sequence of multiples of PTAS. The sequence starts from PTAS*k exceeding the minimal size of IP packets. The minimal size depends on respective protocols; for example, minimal size of IPv4/UDP packets is 28 bytes, minimal size of IPv6/TCP packets is 56 bytes, etc. The sequence ends by PTAS*n which shall be smaller than MTU (maximal transmit unit) reduced by size $\Delta$ of authentication and encryption overhead. Preferably, but not necessary so, the sizes of consecutive packets can constitute an arithmetic progression. The common difference equal to one (as illustrated) can enable the maximal number of original IP packets in a single series.

Thus, in the illustrated non-limiting example, the size of each original IP packet is uniquely indicative of its place in the sequence of test IP packets in the series. For example, in the illustrated series, the sequence number i of original IP packet can be calculated as: $i=(size_o/PTAS)-k+1$.

Further, the size of the original IP packet, being a multiple of PTAS, enables equal sizes of ciphertext and plaintext. Accordingly, the size of each encrypted IP packet (402) uniquely corresponds to the size of the respective original IP packet (and vice versa). Namely, the size of a given IP packet uniquely corresponds to the $size_e$ of the given IP packet when encrypted, $size_e=size_o+\Delta$, where $\Delta$ is the size of AEE overhead corresponding to a respective protocol.

Non-limiting examples of configuration of original IP packets in a series are illustrated in Table 1.

TABLE 1

| Protocol | IPSec ESP (tunnel mode) | WireGuard ® | IPSec ESP (tunnel mode) |
|---|---|---|---|
| Cypher Algorithm | AES-GCM | ChaCha20 for symmetric encryption, authenticated with Poly1305, using RFC7539's | AES-CBC |
| Key Size | 256 bits | 256 bits | 128 bits |
| Block Size | NA | NA | 128 bit |
| PTAS | 4 bytes | 16 bytes | 16 bytes |
| Exemplified series of original IP packets (size) (for IPv4 + UDP) | 32, 36, 40, 44, . . . 1444 bytes | 32, 48, 64, 80, 96, . . . , 1440 bytes (excluding key-exchange packet sizes) | 32, 48, 64, 80, 96, . . . , 1440 bytes |
| Number of IP packets in the exemplified series | 354 | 85 (88 minus 3 excluded sizes corresponding to key-exchange packets) | 88 |
| Size (Δ) of AEE overhead | 54 bytes (tunnel mode with no NAT-T) | 60 bytes | 54 bytes (tunnel mode with no NAT-T) |

It is noted that in a case of protocol combining the key exchange and the Layer 3 transport encryption into one mechanism (e.g. Wireguard®), there is a need to avoid collisions with key-exchange messages. Accordingly, the series can be configured to exclude the sizes of original IP packets corresponding, upon encryption, to the sizes of key-exchange messages.

It is noted that the teachings of the presently disclosed subject matter are not bound by the size of original IP packets being a multiple of PTAS. Likewise, as illustrated by way of non-limiting example with reference to FIG. 4b, the sizes of original IP packets can be configured so that they uniquely match, upon padding, the sizes of encrypted packets, wherein the size (reduced by Δ) of each encrypted packet is a unique multiple of PTAS. For example, a 1s$^r$ packet can have any size between the minimal size of IP packet and PTAS*k, thereby corresponding to an encrypted packet with a size PTAS*k+Δ. A second original IP packet can have any size more than PTAS*k and less or equal to PTAS*(k+1), thereby corresponding to an encrypted packet with a size PTAS*(k+1)+Δ. An original IP packet with the sequence number i can have any size more than PTAS*(k+i−2) and less or equal to PTAS*(k+i−1), thereby corresponding to an encrypted packet with a size PTAS*(k+i−1)+Δ. Thus, also in the non-limiting example illustrated with reference to FIG. 4b, the size of each original IP packet is uniquely indicative of its place in the sequence of test IP packets in the series, and the size of each encrypted IP packet uniquely corresponds to the size of the respective original IP packet. Referring back to FIG. 3, traffic analyzer 201 generates (302) a test traffic comprising the test series of IP packets configured as detailed above, and successively transmits the packets in the generated series to the cipher (configured as expected), whilst associating (303) each transmitted packet with a departure time stamp. Upon encrypting by the cipher, the encrypted packets are transmitted back (304). The traffic analyzer receives the encrypted packets and associates each arrived encrypted packet with a corresponding arrival time stamp (305). Traffic analyzer 201 stores (e.g. in data structure 209) data informative of departure timestamps in association with original IP packets and data informative of arrival timestamps in association with respective IP packets.

For each given received encrypted packet, traffic analyzer 201 (e.g. monitor 205) uses its packet size to identify a size of a matching original IP packet and, accordingly, its place in the transmitted series. As detailed with reference to FIGS. 4a-4b, for a given encrypted packet with size$_e$, traffic analyzer 201 can calculate size$_o$ of corresponding original IP packet (size$_o$=size$_e$−Δ), wherein the size$_o$ uniquely identifies the place of the corresponding original IP packet in the transmitted sequence and, thereby, its departure timestamp. Accordingly, traffic analyzer 201 matches arrival timestamp (TS$_a$) of the given encrypted IP packets and departure timestamp (TS$_d$) of the corresponding original IP packet and, thereby, identifies (306) the pair (TS$_d$; TS$_a$) indicative of delay in delivery for the respective pair of matching IP packets.

Traffic analyzer 201 further uses (307) the identified (TS$_d$; TS$_a$) pairs for calculating statistical latency metrics and for corresponding latency assessment. (TS$_d$; TS$_a$) pairs can be used for latency metrics and/or latency assessment in accordance with any suitable technique known in the art.

In some cases the number of original IP packets in a series is not sufficient for statistic-based latency assessment. In such cases, the test traffic can comprise at least two test series (preferably equally configured) separated by a plurality of IP packets identifiable as "idle" test packets. Preferably, but not necessary so, all idle packets can have the same size being multiple of PTAS. The size(s) of idle IP packets is excluded from the packet sizes in the at least two test series, thereby enabling recognition of the idle packets by their size. The number of idle packets shall be so to enable that the time of transmission of the idle packets between the at least two series significantly exceeds the maximal registered and/or expected latency. By way of non-limiting example, the idle packets between consequent series can be transmitted within several seconds.

Those versed in the art will readily appreciate that the teachings of the presently disclosed subject matter are not bound by assessing latency of a ciphering end point as detailed with reference to FIGS. 2, 3, 4a and 4b. Likewise, the traffic analyzer can be connectable to another interface (e.g. an internal, within the end point, interface between the cipher device and the tunneling block; an interface within the underlying infrastructure of the secured communication channel, etc.) requiring latency-related monitoring before deciphering.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the invention can be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of assessing latency of a ciphering end point of a secured communication channel, the method comprising:
   a) generating, by a traffic analyzer, a test traffic comprising a series of original data packets, wherein, for each original data packet, a size of a given packet is uniquely indicative of the packet's place in a sequence of data packets in the series and enables unique correspondence with a size of the given packet upon its encryption, and wherein the sizes of the sequential original packets in the series are distributed in accordance with a monotonic function;
   b) successively transmitting the original packets in the generated series to the ciphering end point, whilst associating the transmitted original packets with respective departure time stamps;
   c) receiving, by the traffic analyzer, encrypted packets from the ciphering end point and associating the received encrypted packet with respective arrival time stamps, wherein the ciphering end point encrypts the original packets using a ciphering algorithm characterized by a plaintext alignment size (PTAS); and
   d) for each packet of at least part of the received encrypted packet, using a size of a given encrypted packet with a timestamp $TS_a$ to identify a size of a matching original packet, its place in the sequence of original packets and, thereby, its departure timestamp TSd, thus giving rise to a plurality of timestamps pairs ($TS_d$; $TS_a$), each timestamp pair indicative of delay in delivery for a respective pair of matching packets, the plurality of timestamp pairs usable for latency assessment.

2. The method of claim 1, wherein, for any encrypted packet, the size a given encrypted packet is $size_e=size_o+\Delta$, where $size_o$ is the size of the given packet before encryption and $\Delta$ is an AEE (authentication, encryption and encapsulation) overhead corresponding to a protocol applied when creating the secured communication channel.

3. The method of claim 2, wherein the protocol is Encapsulating Security Payload (ESP) protocol, WindGuard® protocol or Media Access Control Security (MACsec) protocol.

4. The method of claim 1, wherein the ciphering end point encrypts the original packets using a block cipher algorithm or stream cipher algorithm.

5. The method of claim 1, wherein a size of each original packet is a unique multiple of PTAS, and the original packets of different unique sizes are distributed in the series in accordance with a predefined function.

6. The method of claim 5, wherein the predefined function is a monotonically increasing sequence of multiples of PTAS.

7. The method of claim 1, wherein the test traffic comprises a plurality of series of original data packets, the method further comprising repeating operations a)-d) for each series of the plurality of series.

8. The method of claim 7, wherein each two series are separated by a plurality of data packets identifiable by the traffic analyzer as "idle" packets, wherein time of transmission of the idle packets between two series significantly exceeds the maximal registered and/or expected latency.

9. The method of claim 8, wherein the idle packets are identifiable by their size.

10. The method of claim 5, wherein the test traffic comprises a plurality of series of original data packets, each two series are separated by a plurality of equal-size data packets identifiable as "idle" packets by their size being the multiple of PTAS, and wherein the respective size is excluded from the sizes of original packets.

11. A traffic analyzer connectable to a ciphering end point of a secured communication channel, the traffic analyzer comprising a processor and memory block (PMB), wherein the PMB is configured to:
   a) generate a test traffic comprising a series of original data packets, wherein, for each original data packet, a size of a given packet is uniquely indicative of the packet's place in a sequence of data packets in the series and enables unique correspondence with a size of the given packet upon its encryption, and wherein the sizes of the sequential original packets in the series are distributed in accordance with a monotonic function;
   b) successively transmit the original packets in the generated series to the ciphering end point, whilst associating the transmitted original packets with respective departure time stamps;
   c) receive encrypted packets from the ciphering end point and associate the received encrypted packet with respective arrival time stamps, wherein the ciphering end point encrypts the original packets using a ciphering algorithm characterized by a plaintext alignment size (PTAS);
   d) for each packet of at least part of the received encrypted packet, use a size of a given encrypted packet with an arrival timestamp $TS_a$ to identify a size of a matching original packet, its place in the sequence of original packets and, thereby, its departure timestamp TSd, thus giving rise to a plurality of timestamps pairs ($TS_d$; $TS_a$), each timestamp pair indicative of delay in delivery for a respective pair of matching packets; and
   e) use the plurality of timestamp pairs for assessing latency of the ciphering end point.

12. The traffic analyzer of claim 11, wherein, for any encrypted packet, the size a given encrypted packet is $size_e=size_o+\Delta$, where $size_o$ is the size of the given packet before encryption and $\Delta$ is an AEE (authentication, encryption and encapsulation) overhead corresponding to a protocol applied when creating the secured communication channel.

13. The traffic analyzer of claim 11, wherein a size of each original packet is a unique multiple of PTAS, and the original packets of different unique sizes are distributed in the series in accordance with a predefined function.

14. The traffic analyzer of claim 13, wherein the predefined function is a monotonically increasing sequence of multiples of PTAS.

15. The traffic analyzer of claim 11, wherein the test traffic comprises a plurality of series of original data packets, the method further comprising repeating operations a)-d) for each series of the plurality of series.

16. The traffic analyzer of claim 15, wherein each two series are separated by a plurality of data packets identifiable by the traffic analyzer as "idle" packets, wherein time of transmission of the idle packets between two series significantly exceeds the maximal registered and/or expected latency, the idle packets are identifiable by their size.

17. The traffic analyzer of claim 13, wherein the test traffic comprises a plurality of series of original data packets, each two series are separated by a plurality of equal-size data packets identifiable as "idle" packets by their size being the multiple of PTAS, and wherein the respective size is excluded from the sizes of original packets.

18. A non-transitory computer-readable medium comprising instructions that, when executed by a computer, cause the computer to:
  a) generate a test traffic comprising a series of original data packets, wherein, for each original data packet, a size of a given packet is uniquely indicative of the packet's place in a sequence of data packets in the series and enables unique correspondence with a size of the given packet upon its encryption, and wherein the sizes of the sequential original packets in the series are distributed in accordance with a monotonic function;
  b) successively transmit the original packets in the generated series to a ciphering end point of a secured communication channel, whilst associating the transmitted original packets with respective departure time stamps;
  c) receive encrypted packets from the ciphering end point and associate the received encrypted packet with respective arrival time stamps, wherein the ciphering end point encrypts the original packets using a ciphering algorithm characterized by a plaintext alignment size (PTAS);
  d) for each packet of at least part of the received encrypted packet, using a size of a given encrypted packet with a timestamp TSa to identify a size of a matching original packet, its place in the sequence of original packets and, thereby, its departure timestamp TSd, thus giving rise to a plurality of timestamps pairs (TSd; TSa), each timestamp pair indicative of delay in delivery for a respective pair of matching packets; and
  e) use the plurality of timestamp pairs for assessing latency of the ciphering end point.

\* \* \* \* \*